(12) United States Patent
Pomerantz et al.

(10) Patent No.: US 11,219,785 B1
(45) Date of Patent: Jan. 11, 2022

(54) CHEMICAL AND BIOLOGICAL THERMAL ENSEMBLE AND COMPOSITE FABRIC

(71) Applicant: U.S. Government as Represented by the Secretary of the Army, Natick, MA (US)

(72) Inventors: Natalie L Pomerantz, Newton, MA (US); Stephanie M Tew, Salem, VA (US)

(73) Assignee: U.S. Government as Represented by the Secretary of the Army, Washington, DC (US)

( * ) Notice: Subject to any disclaimer, the term of this patent is extended or adjusted under 35 U.S.C. 154(b) by 328 days.

(21) Appl. No.: 15/991,140

(22) Filed: May 29, 2018

Related U.S. Application Data

(60) Provisional application No. 62/512,222, filed on May 30, 2017.

(51) Int. Cl.
| | | |
|---|---|---|
| *A62B 17/00* | (2006.01) | |
| *B32B 27/08* | (2006.01) | |
| *B32B 27/30* | (2006.01) | |
| *A41D 1/06* | (2006.01) | |
| *A41D 1/02* | (2006.01) | |
| *C08L 27/18* | (2006.01) | |

(52) U.S. Cl.
CPC ............ *A62B 17/006* (2013.01); *B32B 27/08* (2013.01); *B32B 27/304* (2013.01); *C08L 27/18* (2013.01); *A41D 1/02* (2013.01); *A41D 1/06* (2013.01); *A41D 2500/50* (2013.01); *B32B 2307/7265* (2013.01); *B32B 2437/00* (2013.01); *C08L 2203/02* (2013.01)

(58) Field of Classification Search
CPC .... B32B 5/02; B32B 5/24; B32B 5/28; B32B 27/02; B32B 27/12; B32B 27/322; B32B 2255/02; B32B 2307/724; B32B 2307/7242; B32B 2307/7244; B32B 2307/7246; B32B 2307/7248; B32B 2307/2307; B32B 27/08; B32B 27/304; B32B 2437/00; B32B 2307/7265; A62B 17/006; C08L 27/18; C08L 2203/02; A41D 2500/50; A41D 1/06; A41D 1/02
See application file for complete search history.

(56) References Cited

U.S. PATENT DOCUMENTS

| | | |
|---|---|---|
| 4,816,330 A | 3/1989 | Freund |
| 4,865,903 A * | 9/1989 | Adiletta ............... A62B 17/006 428/215 |
| 4,868,928 A * | 9/1989 | Norvell ................. B32B 27/08 2/272 |
| 6,119,506 A | 9/2000 | Gibson |
| 6,691,326 B2 | 2/2004 | Hexels |
| 6,792,625 B2 | 9/2004 | Hexels |
| 7,062,788 B2 | 6/2006 | Tremblay-Lutter |
| 9,107,463 B2 | 8/2015 | Ozawa |
| 9,155,921 B2 | 10/2015 | Ozawa |

(Continued)

*Primary Examiner* — Elizabeth C Imani
(74) *Attorney, Agent, or Firm* — Roger C. Phillips

(57) ABSTRACT

The disclosed subject matter relates to chemical and biological protective garments and ensembles (i.e., two-part garments that when worn together cover most of the human body) and composite fabrics used therein. The composite fabrics include embodiments having a fabric cover layer combined with a vapor protective layer.

5 Claims, 13 Drawing Sheets

(56) References Cited

U.S. PATENT DOCUMENTS

| | | | | |
|---|---|---|---|---|
| 2009/0123713 A1* | 5/2009 | Conley | ................ | B32B 27/304 |
| | | | | 428/196 |
| 2010/0077529 A1* | 4/2010 | Stone | .................... | B01D 69/02 |
| | | | | 2/85 |
| 2011/0167547 A1* | 7/2011 | Jain | ........................ | B32B 5/026 |
| | | | | 2/457 |

\* cited by examiner

| | Permeation (µg/cm²) | | | |
|---|---|---|---|---|
| | 1g/m² Challenge | | 3g/m² Challenge | |
| | Fabric Q | Fabric Q with aerosol liner | Fabric Q | Fabric Q with aerosol liner |
| HD 8hr | 1.94 ± 0.66 | 1.30 ± 1.45 | 3.99 ± 1.60 | 4.17 ± 2.79 |
| HD 24hr | 2.93 ± 0.63 | 1.89 ± 1.85 | 6.54 ± 1.86 | 6.47 ± 3.68 |
| GD 8hr | 0.26 ± 0.01 | <MDL | 0.84 ± 0.10 | <MDL |
| GD 24hr | 0.45 ± 0.17 | <MDL | 2.00 ± 0.18 | 0.38 ± 0.26 |

| | Permeation (µg/cm2) | | | |
|---|---|---|---|---|
| | Fabric A over Liner D | Fabric A laminated Liner D | Fabric E over Liner D | Fabric E laminated Liner D |
| HD 8hr | <MDL | 0.32 ± 0.02 | 0.13 ± 0.16 | 8.20 ± 3.02 |
| HD 24h | <MDL | 0.78 ± 0.03 | 0.28 ± 0.41 | 9.83 ± 3.43 |
| GD 8hr | <MDL | <MDL | <MDL | 3.48 ± 0.53 |
| GD 24h | <MDL | 0.17 ± 0.08 | <MDL | 4.69 ± 0.48 |

CHEMICAL AND BIOLOGICAL THERMAL ENSEMBLE AND COMPOSITE FABRIC

CROSS-REFERENCE TO RELATED APPLICATIONS

This application claims priority to and the benefit of U.S. Provisional Patent Application Ser. No. 62/512,222 filed May 30, 2017, the disclosure of which is incorporated herein by reference in its entirety.

FIELD

This disclosure relates to chemical and biological protective ensembles, composite fabrics, methods of manufacture and components thereof.

BACKGROUND

Certain chemical and biological agents can be destructive weapons used to terrorize, incapacitate, harm, or kill. Such agents can pose a real and growing threat to military personnel, as well as civilians. As a result, there is a growing need to protect both the military personnel and civilians, and other life (such as animals) from the release of such agents.

Some chemical and biological protective garments can be heavy in weight and impose a high thermal burden on the wearer. The latter may only permit the wearer to remain in the protective garment for a short period of time because the core temperature of the wearer rises due to minimal heat transfer through the garment to the external environment and reduced evaporative cooling. For example, air gaps in the fabric layer can contribute to such poor heat transfer because air is a heat insulator.

It would be advantageous to have a chemical and biological protective garment that is lighter in weight and provides better heat transfer from inside the garment to outside the garment.

SUMMARY

In one embodiment, a composite fabric is provided. The composite fabric includes a fabric cover layer and a vapor protective layer, wherein adjacent layers are laminated to one another to eliminate or substantially eliminate air gaps therebetween.

In another embodiment, a composite fabric is provided. The composite fabric includes a fabric cover layer, a vapor protective layer, an aerosol protective layer and a comfort layer, wherein adjacent layers are laminated to one another to eliminate or substantially eliminate air gaps therebetween.

In another embodiment, a protective garment is provided. The protective garment includes a composite fabric that includes a fabric cover layer and a vapor protective layer, wherein adjacent layers are laminated to one another to eliminate or substantially eliminate air gaps therebetween.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Aspects of the disclosed embodiments are directed to chemical and biological protective garments and ensembles (i.e., two-part garments that when worn together cover most of the human body), composite fabrics, methods of manufacture and components thereof.

Figure 1:
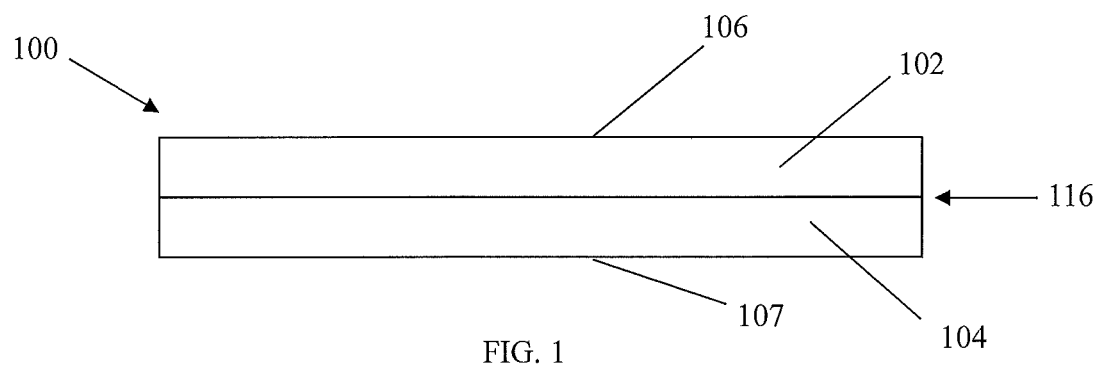
FIG. 1 is a schematic illustration of a cross section of an embodiment of the present disclosure.

FIG. 1 is illustrative of aspects of one embodiment of a protective composite fabric 100. Protective composite fabric 100 includes fabric cover layer 102 and an aerosol protective layer 104. The fabric cover layer 102 can include, for example, fire resistant or non-fire-resistant materials, stretch or non-stretch fabrics, knit or woven fabric materials that can be, for example, aramid-based flame-resistant material, cotton, nylon, blends such as cotton blends and nylon/cotton blends, polyester or polyester blends. The weight of fabric cover layer 102 can range from about 2.0 osy (ounces per square yard) to about 7.5 osy, preferably from about 4.5 osy to about 6.0 osy. External surface 106 of fabric cover layer 102 can be designed to face the external environment (e.g. the outside of the garment in which protective composite fabric 100 is used that can include sunlight, rain, gas agents, aerosols and other external environmental conditions) can also optionally include a repellant coating, such as, for example, a liquid repellant coating (such as silica based liquid repellent coatings or perfluoronated carbon based liquid repellent coatings). Internal surface 107 of aerosol protective layer 104 can be designed to face the internal environment (e.g. closer to the body of the wearer of a garment protective composite fabric 100 is used). The aerosol protective layer 104 can be a material that is substantially impervious to penetration by aerosol particles (such as dust and aerosolized chemical agents, for example, dusty mustard, or biological agents) and can include material, such as, for example, expanded polytetrafluoroethylene (ePTFE), preferably microporous ePTFE, nanofibers such as polyurethane, polysulfone, nylon-6, polyvinylidene difluoride, polyether sulfone, or other polymer and microfibers such as polypropylene microfibers or microfibers of another polymer. The weight of aerosol protective layer 104 can range from about 0.2 osy to about 2.0 osy, preferably from about 0.5 osy to about 1.0 osy.

In tests, inclusion of an aerosol liner decreased air permeation, and decreased Moisture Vapor Transmission Rate (MVTR) and thermal resistance (Rct). The following protective composite fabric embodiments of FIG. 1 were tested: Fabric A—fabric cover layer is a stretch woven aramid fiber blend with a liquid repellent coating and the aerosol protective layer is ePTFE; Fabric B—fabric cover layer is a woven ripstop aramid blend with a liquid repellent coating and the aerosol protective layer is ePTFE; Fabric D—fabric cover layer is a woven cotton blend laminated to a sorptive liner and the aerosol protective layer is polypropylene microfibers; Fabric E—fabric cover layer is a woven cotton blend laminated to a sorptive liner and the aerosol protective layer is polyurethane nanofibers; Fabric F—fabric cover layer is a woven aramid fiber blend laminated to a sorptive liner and the aerosol protective layer is polyurethane nanofibers; Fabric G—fabric cover layer is a woven aramid fiber blend laminated to a sorptive liner and the aerosol protective layer is polyurethane nanofibers; and Fabric H—woven ripstop aramid blend with a liquid repellent coating and the aerosol protective layer is ePTFE.

Figure 2:
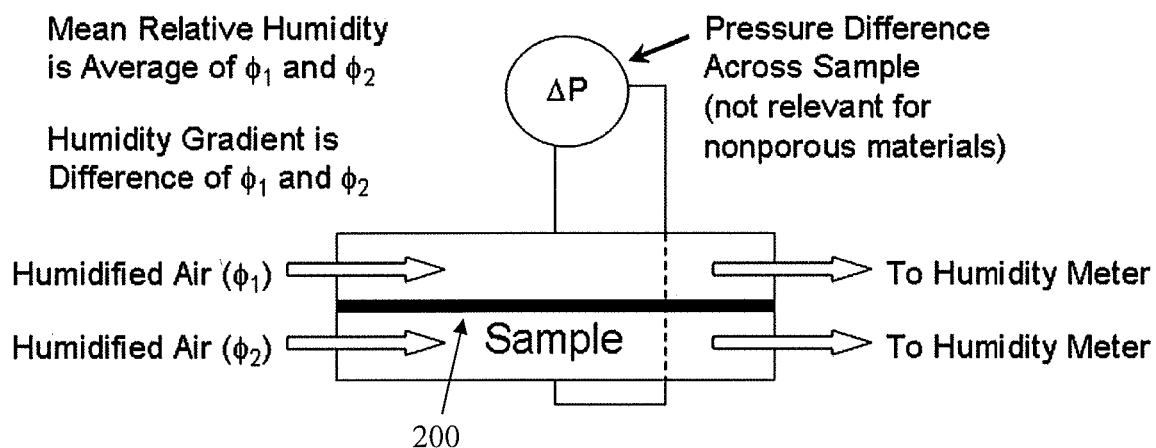
FIG. 2 is a schematic illustration of an apparatus to test air permeation and moisture vapor transmission rate (MVTR) and air permeation

Moisture vapor transmission rate (MVTR) and air permeation were determined using a diffusion/permeation method and the apparatus illustrated in FIG. 2 (Gibson, P., Kendrick, C., Rivin, D., "Apparatus and method for determining transport properties of porous materials," U.S. Pat. No. 6,119,506, Sep. 19, 2000), stepping the pressure differential slowly from negative to positive, 90% humidity gradient was used, $\varphi1=5\%$ Rh and $\varphi2=95\%$ Rh, measures in g/m2/day and air permeation in cubic feet per minute (cfm). In the FIG. 2 apparatus, humidity meters, one for each flow provided the measurements and test sample 200 is one of the composite fabrics detailed in the previous paragraph.

Figure 3:
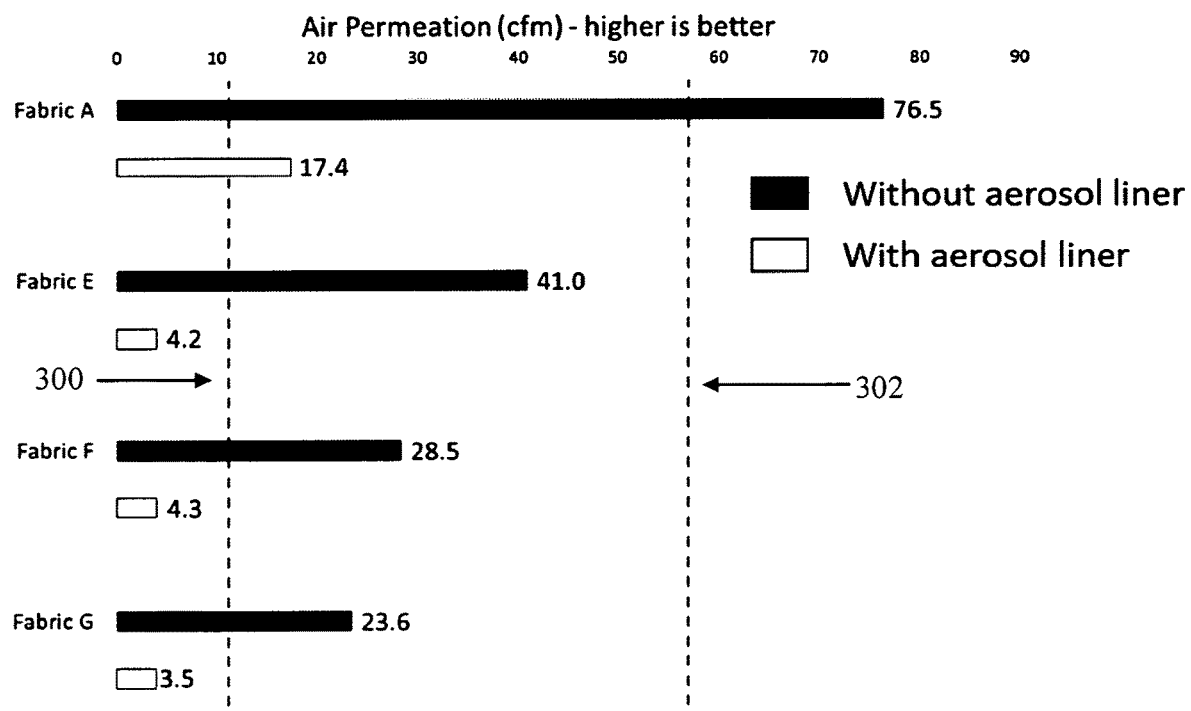
FIG. 3 is a graphical illustration of air permeation data.

The effect of an aerosol protective layer on air permeation is shown in FIG. 3 for Fabrics A, E, F and G both with and without the above aerosol protective layer demonstrate that the aerosol protective layer reduces air permeation where the solid bar represents the fabric cover layer alone and the outlined white bar represents the fabric cover layer with the aerosol protective layer as shown in FIG. 1. Also in FIG. 3 is the data for a baseline Chem/Bio protective garment 300 and a fabric of a standard duty uniform 302.

Figure 4:
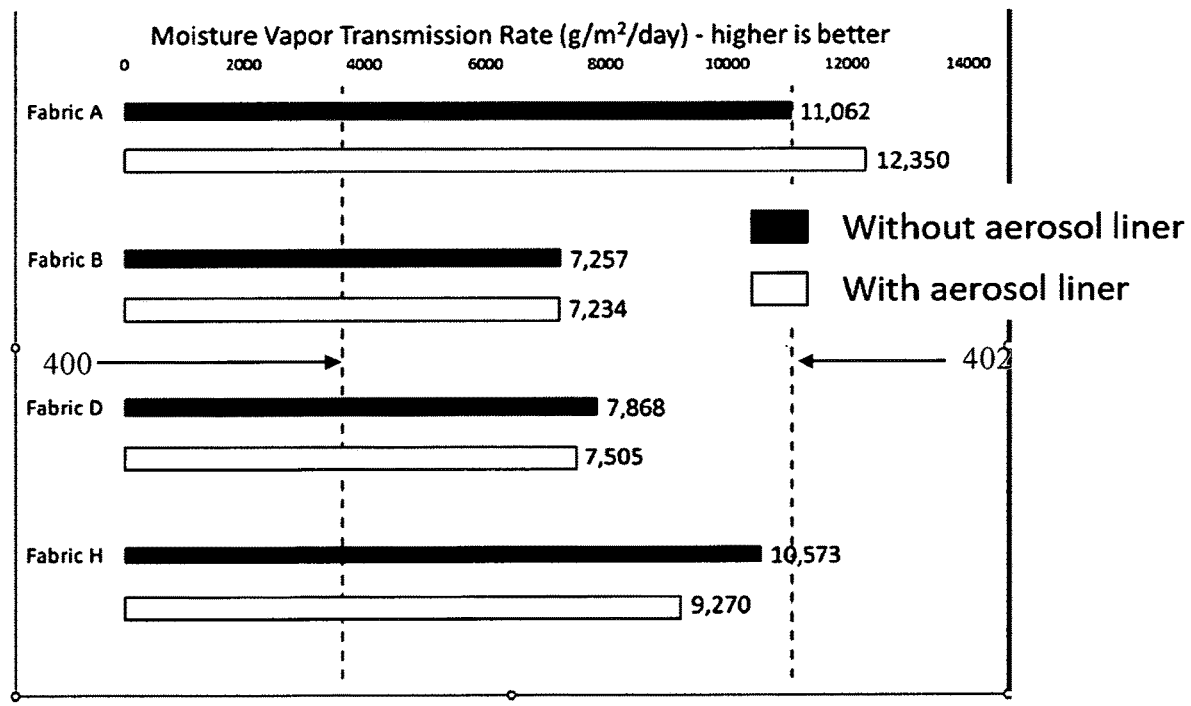
FIG. 4 is a graphical illustration of MVTR data.

The effect of an aerosol protective layer on MVTR is shown in FIG. 4 for Fabrics A, B, D and H both with and without the above aerosol protective layer demonstrate that the aerosol protective layer produces minimal change, if any, in MVTR where the solid bar represents the fabric cover layer alone and the outlined white bar represents the fabric cover layer with the aerosol protective layer as shown in FIG. 1. Also in FIG. 4 is the data for a baseline Chem/Bio protective garment 400 and a fabric of a standard duty uniform 402.

Figure 5:
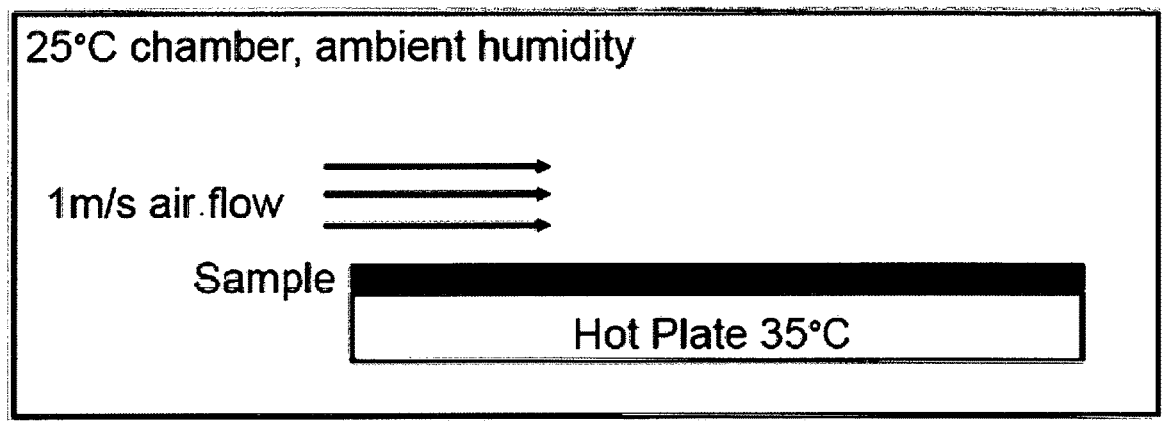
FIG. 5 is a schematic illustration of an apparatus to test thermal resistance (Rct)

Thermal swatch testing using a guarded hot plate (GHP) method and apparatus illustrated in FIG. 5 (method available as ASTM C177-13) was used to measure thermal resistance (Rct) in which the hot plate was kept at 35° C. in a climatic chamber regulated to 25° C. in ambient humidity while air is flowed across the top of the fabric at 1 m/s.

Figure 6:
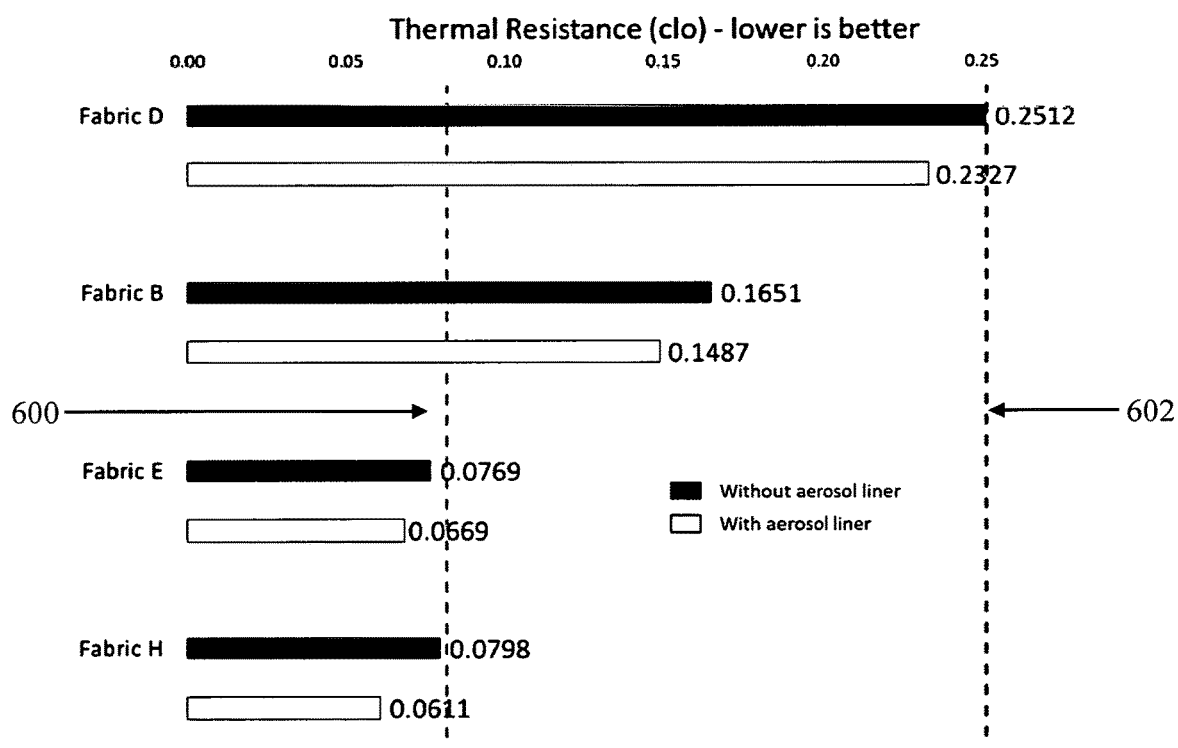
FIG. 6 is a graphical illustration of Rct data.

The effect of an aerosol protective layer on Rct is shown in FIG. 6 for Fabrics B, D, E and H both with and without the above aerosol protective layer demonstrate that the aerosol protective layer reduces the Rct of the fabric cover layer where the solid bar represents the fabric alone and the outlined white bar represents the fabric cover layer with the aerosol protective layer as shown in FIG. 1. This effect may be due to the aerosol protective layer lamination process may reduce the thickness of the fabric cover layer and/or decrease the air within the fabric cover layer. Also in FIG. 6 is the data for a baseline Chem/Bio protective garment 600 and a fabric of a standard duty uniform 602.

Figures 7, 8:
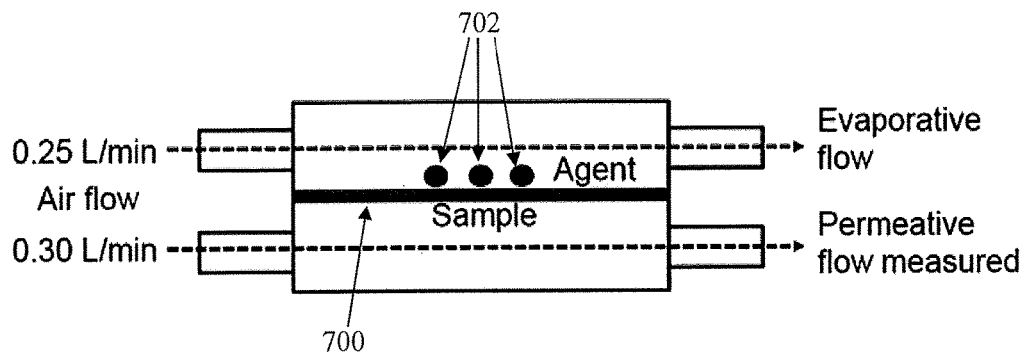
FIG. 7 is a schematic illustration of an apparatus to test aerosol vapor liquid assessment group (AVLAG)
FIG. 8 is a table of AVLAG data.

Aerosol vapor liquid assessment group (AVLAG) was run in dual-flow method and apparatus illustrated in FIG. 7 (test operation procedure available as (TOP)8-2-501) was used in which streams of air flowing across the top and bottom of the sample swatch 700 where agent 702 included 1 μL liquid drops of mustard (HD) or nerve agent (GD) were used to challenge the sample swatch 700 at concentrations of 1 and 3 g/m$^2$ Cumulative agent permeation values were measured at 8 and 24 hours. Readings were made of permeative flow 704 using thermal desorption and <MDL means that the reading was below the minimum detection limit of 0.125 μg/cm$^2$. Fabric Q is a cotton knit blend laminated to a sorptive liner.

The results are shown in the table of FIG. 8 demonstrate that HD has a breakthrough of about 4 μg/cm$^2$ and GD has a limit of about 1.25 μg/cm$^2$ and that aerosol protective layer line composites have a lower air permeation than unlined composites (i.e., a fabric cover layer alone).

Figure 9:
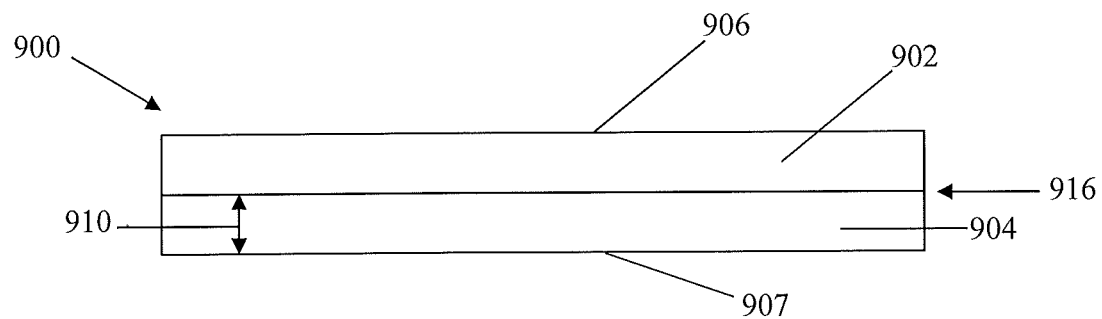
FIG. 9 is a schematic illustration of a cross section of an embodiment of the present disclosure.

FIG. 9 is illustrative of aspects of other embodiments of a protective composite fabric 900. Protective composite fabric 900 includes fabric cover layer 902 and a vapor protective layer 904. The fabric cover layer 902 is as included above in the disclosure of fabric cover layer 102 in FIG. 1. External surface 906 of fabric cover layer 902 can be designed to face the external environment as described in external surface 106 in FIG. 1 and can also optionally include a repellant coating, such as those included above in FIG. 1. Internal surface 907 of aerosol protective layer 904 can be designed to face the internal environment as described in internal surface 107 in FIG. 1. The weight of fabric cover layer 902 is as included above in the disclosure for fabric cover layer 102. The vapor protective layer 904 can be a material that substantially prevents penetration by chemical agents including mustard and other blister agents, Sarin, Soman, VX and other nerve agents and chemical warfare agents but capable of allowing water vapor transfer and can include material such as, for example, semi-permeable membranes such as Chempak (a product from WL Gore) or ChemCAT (a product from Stedfast). The vapor protective layer 904 can also be a sorptive material that adsorbs chemical agents and can be, for example carbon based liners including activated carbon cloth such as Zoreflex or Stedchem, carbon beads such as the Saratoga series of liners, or carbon particles attached with binders to a polymer matrix such as made by Freudenberg. The thickness 910 of vapor protective layer 904 if a semi-permeable membrane can be about 0.5 mils to 10 mils and if vapor protective layer 904 is a sorptive material, it can have a sorptive loading of about 25-about 250 g/m2.

Figure 10:
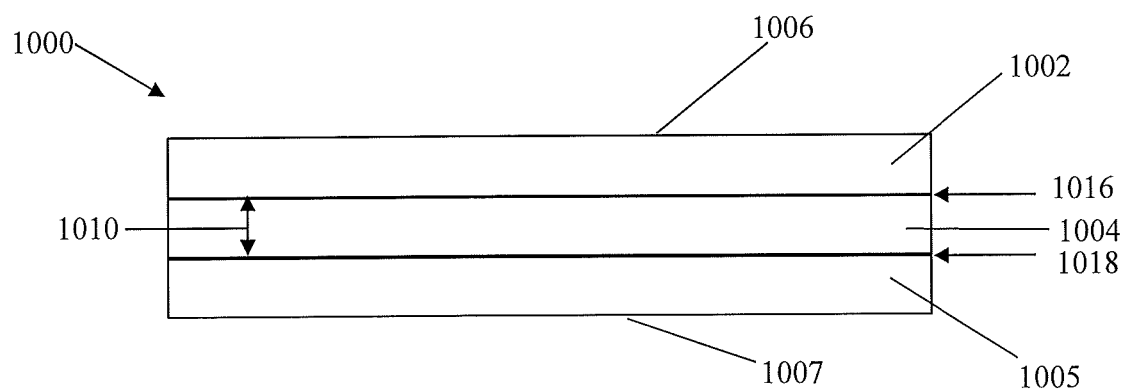
FIG. 10 is a schematic illustration of a cross section of an embodiment of the present disclosure.

FIG. 10 is illustrative of aspects of other embodiments of a protective composite fabric 1000. Protective composite fabric 1000 includes fabric cover layer 1002, a vapor protective layer 1004 and an inner layer 1005. The fabric cover layer 1002 is as included above in the disclosure of fabric cover layer 102 in FIG. 1. External surface 1006 of fabric cover layer 1002 can be designed to face the external environment as described in external surface 106 in FIG. 1 and can also optionally include a repellant coating, such as those included above in FIG. 1. The weight of fabric cover layer 1002 is as included above in the disclosure for fabric cover layer 102. The vapor protective layer 1004 is as included above in the disclosure of vapor protective layer 904 in FIG. 9. Thickness 1010 is as included above in the disclosure of thickness 910 in FIG. 9 if vapor protective layer 1004 is a semi-permeable membrane. If vapor protective layer 1004 is a sorptive material, it can have the same sorptive loading as included above in the disclosure of vapor protective layer 904. Comfort layer 1005 is intended to have internal surface 1007 in contact with the wearer of a garment that includes protective composite fabric 1000 and/or other garments worn by the wearer of a garment that includes protective composite fabric 1000 or to face the internal environment as described in internal surface 107 in FIG. 1. Comfort layer 1005 can include, for example, a cotton knit or cotton blend knit or other knit or woven fabric that provides comfort against the skin. The weight of comfort layer 1005 can range from about 0.5 osy to about 4.0 osy, preferably from about 1.0 osy to about 2.5 osy.

Figure 11:
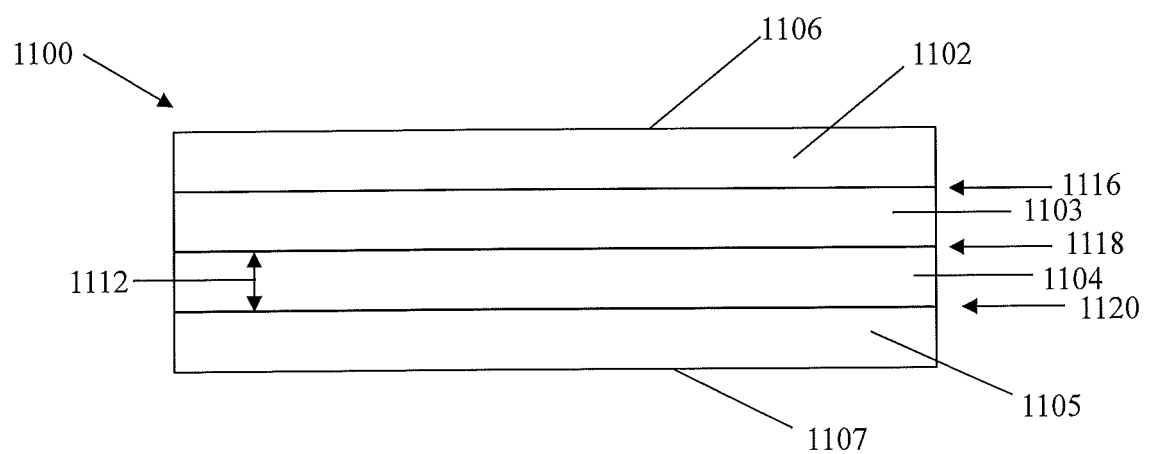
FIG. 11 is a schematic illustration of a cross section of an embodiment of the present disclosure.

FIG. 11 is illustrative of aspects of other embodiments of a protective composite fabric 1100. Protective composite fabric 1100 includes fabric cover layer 1102, an aerosol protective layer 1103, a vapor protective layer 1104 and a comfort layer 1105. The fabric cover layer 1102 is as included above in the disclosure of fabric cover layer 102 in FIG. 1. External surface 1106 of fabric cover layer 1102 can be designed to face the external environment as described in external surface 106 in FIG. 1 and can also optionally include a repellant coating, such as those included above in FIG. 1. The weight of fabric cover layer 1102 is as included above in the disclosure for fabric cover layer 102. Aerosol protective layer 1103 is as included above in the disclosure of aerosol protective layer 104 in FIG. 1. The weight of aerosol protective layer 1103 is as included above in the disclosure for aerosol protective layer 104. Vapor protective layer 1104 is as included above in the disclosure of vapor protective layer 904 in FIG. 9. The thickness 1012 of vapor protective layer 1104 is as included above in the disclosure of thickness 910 in FIG. 9. Comfort layer 1105 is as included above in the disclosure of if inner layer 1005 is a comfort layer in FIG. 10. The weight of comfort layer 1105 is as included above in the disclosure for comfort layer 1005. Internal surface 1107 is as included above in the disclosure of internal surface 1007 in FIG. 10.

Lamination for affixing the layers of embodiments of protective composite fabrics of the present disclosure may include dot matrix adhesives, web adhesives, other adhesive patterns or methods including gravure rolls, reverse gravure rolls, nanofiber adhesives and other methods. Preferably, the lamination eliminates or substantially eliminates air gaps from the boundary between adjacent layers, examples of such boundaries can include boundary 116 in FIG. 1, boundary 916 in FIG. 9, boundaries 1016 and 118 in FIG. 10 and boundaries 1116, 1118 and 1120 in FIG. 11. As a result of removing or substantially removing air gaps, thermal transfer, for example, heat generated from the wearer of garment constructed of an embodiment of the protective composite fabrics of the present disclosure, is more efficient from one side of the protective composite fabric to the other side than if such air gaps were present. This is because air gaps in a protective composite fabric layer can contribute to poor heat transfer because air is an insulator.

Embodiments of protective garments that include protective composite fabrics of the present disclosure may one piece or multi-piece (e.g., two-piece) garments. Such protective garments can be configured to cover a substantial portion of the wearer including the head, neck, torso, arms and legs. Such protective garments can also be configured to cover the hands and feet through the use of gloves and boots, respectively, that can be include protective composite fabrics of the present disclosure and be separate or integral to the protective garment.

One embodiment of a protective garment that includes protective composite fabric embodiments of the present disclosure is illustrated in FIGS. 12A, 12B, 12C and 12D. This embodiment is a two-piece garment including a shirt 1200 (the front view shown in FIG. 12A and the back view shown in FIG. 12B) and trousers 1202 (the front view shown in FIG. 12C and the back view shown in FIG. 12D). The shirt and trousers include sections of stretch protective composite fabric that includes protective composite fabrics of the present disclosure (dots), non-stretch protective composite fabric that includes protective composite fabrics of the present disclosure (white areas) and a non-stretch non-protective fabric (random dashed lines) as shown in the legend included in the figures. The difference between stretch protective composite fabrics and non-stretch protective composite fabric can be related to the fabric cover layers used therein. A stretch protective composite fabric may include a fabric cover layer that stretches (for example a knit fabric material) and, thereby, provides a protective composite fabric that can stretch. A non-stretch protective composite fabric may include a fabric cover layer that does not stretch (for example a woven fabric material), thereby, provides a protective composite fabric that cannot stretch. The different stretch protective composite fabric sections, non-stretch protective composite fabric sections and non-stretch non-protective fabric sections can be connected by, for example, joining the seams of adjacent sections using traditional cut and sew techniques. Like sections made of the same material may be integral or connected to one another similarly.

Figure 12A:
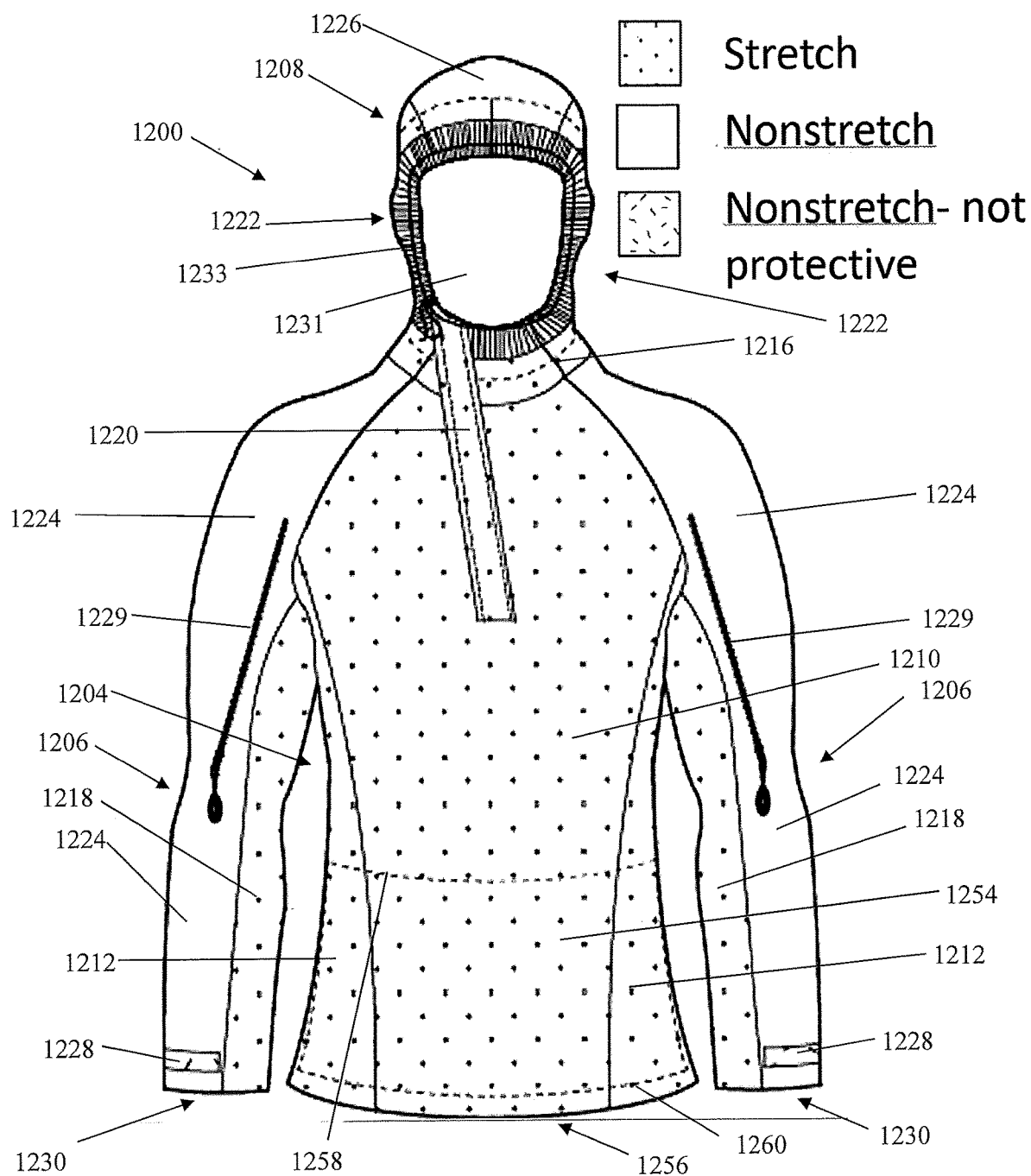
FIGS. 12A, 12B, 12C and 12D are schematic illustrations of an embodiment of the present disclosure.
Figure 12B:
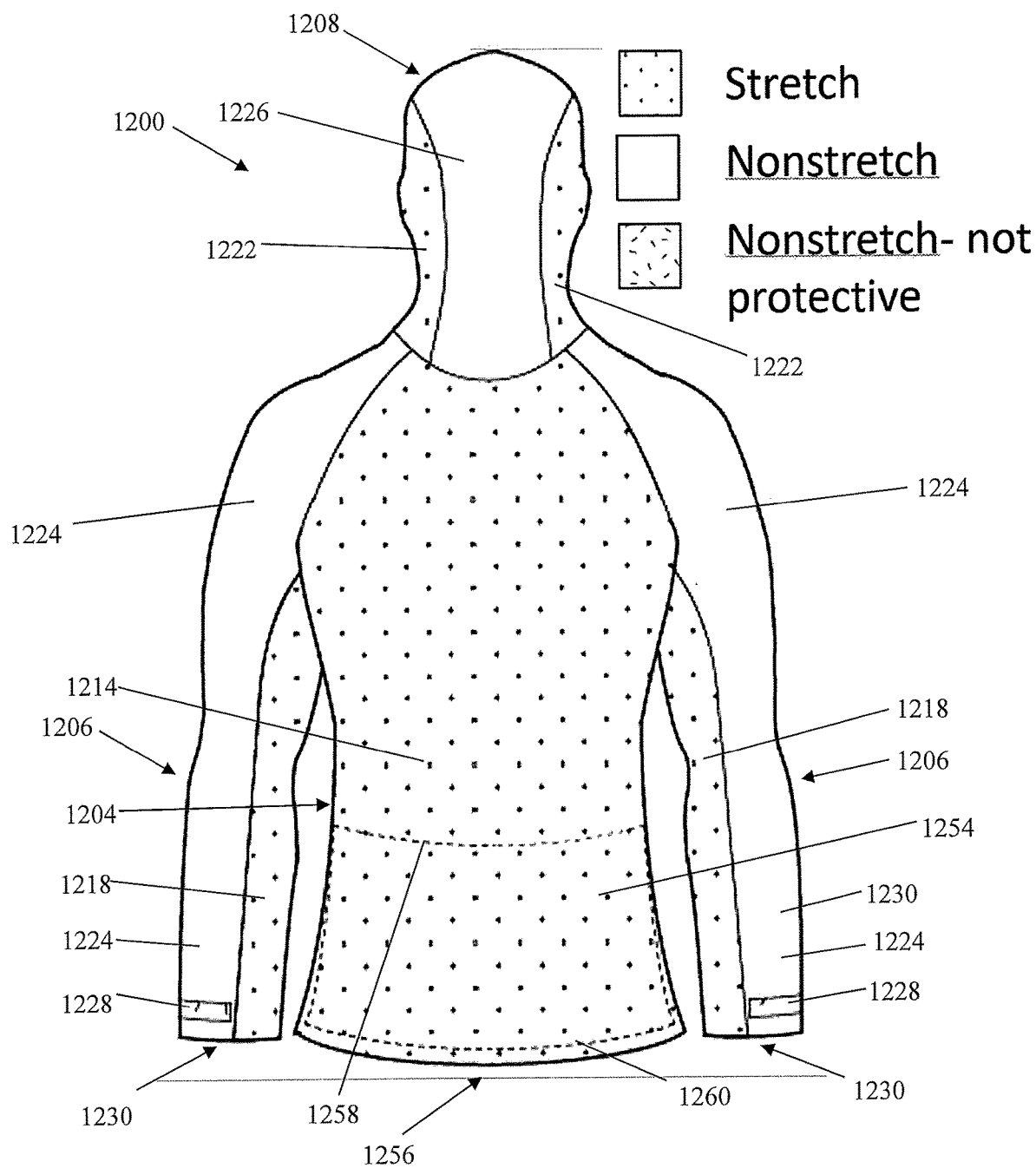

As illustrated in FIGS. 12A and 12B, shirt 1200 includes a torso 1204, arms 1206 and a hood 1208 that is integral. Shirt 1200 has sections of stretch protective composite fabric including fabric shirt front section 1210, shirt side panel sections 1212 that may be integral or connected to shirt back panel 1214 and shirt front neck sections 1216 that can be part of torso 1204 as well as shirt inner sleeve sections 1218 that are part of sleeves 1206. Shirt closure flap 1220 is part of shirt front section 1210. Hood 1208 has sections of stretch protective composite fabric including hood side panels 1222. Shirt 1200 has sections of non-stretch protective composite fabric including shirt outer sleeve sections 1224 and shirt top hood section 1226 (where these sections can be integral or connected). Shirt 1200 may also have sleeve adjustment tabs 1228 proximal to sleeve openings 1230 of arms 1206 that may be made of non-stretch non-protective fabric and zippers 1229 that may be used for ventilation in arms 1206. Hood 1208 also includes a face opening 1231 that is encircled by a face opening liner 1233 made of stretch protective composite fabric that may be to conform to the face surface of a wearer positioned therein and substantially deter the passage of chemical and/or biological agents into the interior of the garment. Face opening 1231 and face opening liner 1233 may be configured to cooperate with a chemical and/or biological agent resistant mask or other apparatus (including a breathing apparatus) to protect the wearer from such chemical and/or biological agents and may include inner skirt (stretch protective) that is joined to the front, back and side torso on the interior of the shirt.

Figure 12C:
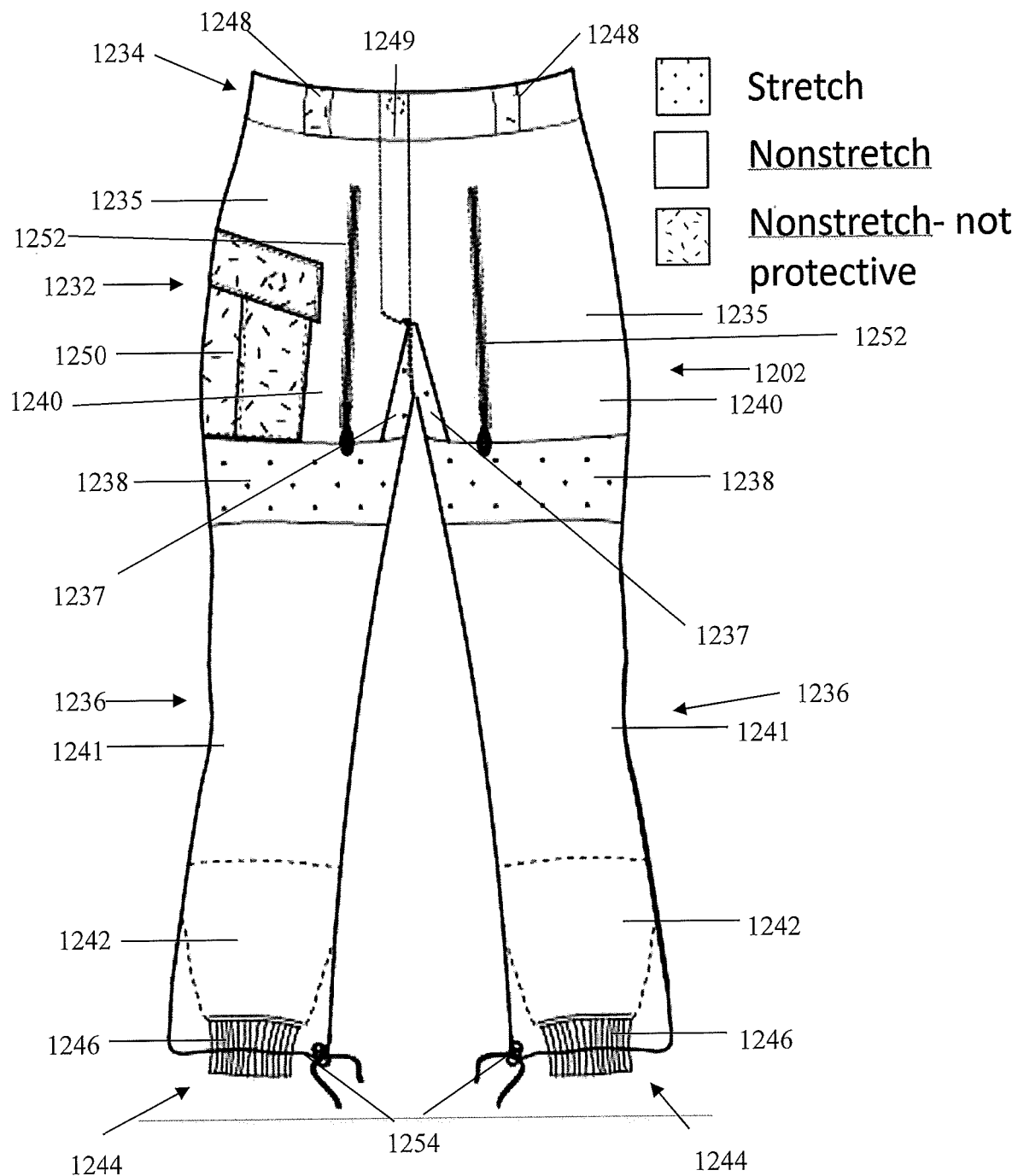
Figure 12D:
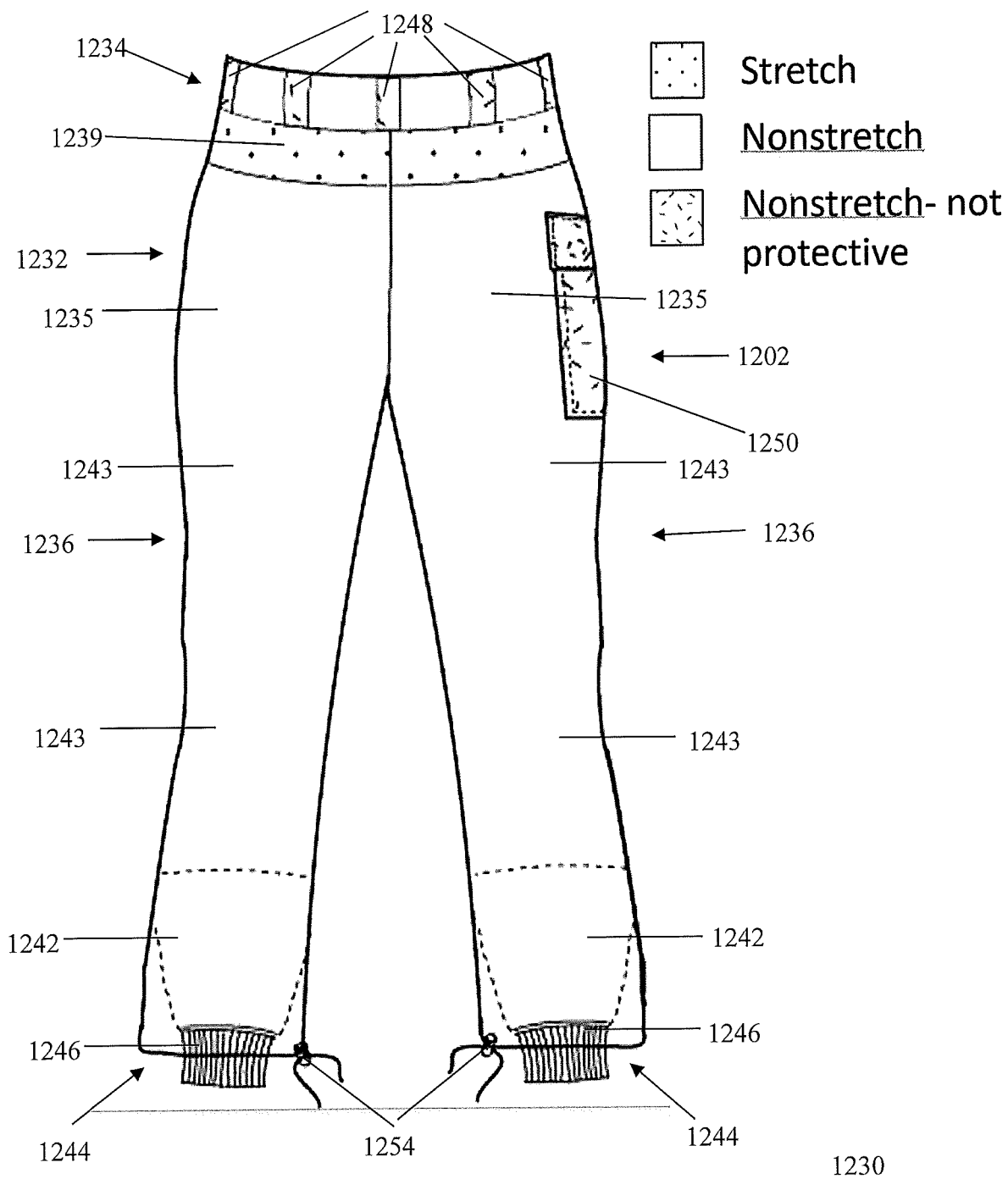

As illustrated in FIGS. 12C and 12D, trousers 1202 includes a trouser rise 1232 that includes a waistband 1234 and trouser legs 1236. Trouser 1202 has sections of stretch protective composite fabric including trouser thigh panel 1238 on the front of each trouser leg 1236, crotch gusset sections 1237 that join together or are integral just below the trouser rise 1232 and a rear hip panel 1239 that may be positioned below waist section 1234 around the back and sides of Trouser rise 1232. Trouser 1202 has sections of non-stretch protective composite fabric including front and back sections of trouser rise 1235, upper front trouser leg sections 1240 that may be connected to or integral trouser rise 1232, lower front trouser leg sections 1241 and back leg sections 1243. Internal trouser lining 1242 proximal and, optionally, recessed to trouser leg openings 1244. Internal trouser lining 1242 made of stretch protective composite fabric may also include a cuff 1246 that may extend beyond trouser leg opening 1244 and be made of stretch protective composite fabric that may be an elasticized cuff to form to the leg portion of a wearer positioned therein and substantially deter the passage of chemical and/or biological agents into the interior of the garment. Trouser 1202 may also have belt loop sections 1248, a pant fly 1249 including various connectors, buttons or a zipper, pocket 1250 that may be made of non-stretch non-protective fabric and zippers 1252 that may be used for ventilation. Pocket 1250 may be an external flap pocket. Trouser openings 1244 may also include drawcord and cordlock 1254 that secure the pant to the boot As illustrated in FIGS. 12A and 12B, torso 1204 may also include an internal torso lining 1254 that may be made of stretch protective composite fabric. The internal torso lining 1254 may be proximal to and recessed from waist opening 1256 in torso 1204 and extend from upper torso lining edge 1258 to lower torso lining edge 1260 extending around torso 1204. Internal torso lining 1254 may be affixed to the inside of jersey 1200 at a position along or adjacent to upper torso lining edge 1258. Lower torso lining edge 1260 of internal torso lining 1250 should remain unattached. When a wearer dons jersey 1200 and pants 1202, internal torso lining 1254 is configured to be positioned inside of waist section 1234 with the portion of torso 1204 proximal to waist opening 1256 configured to be positioned over the outside of waist section 1234 in order to substantially deter the passage of chemical and/or biological agents into the interior of the garment.

The various sections of stretch protective composite fabric are positioned in the embodiment illustrated in FIGS. 12A, 12B, 12C and 12D so as to allow for more ease in freedom of movement by the wearer. Such as, for example, jersey front collar section 1216 and hood side panels 1222 for head and neck movement, jersey front section 1210, jersey side panel sections 1212 and jersey back panel 1214 for torso movement, inner arm sections 1218 for arm movement and pant thigh bands 1238 crotch sections 1237 and rear hip band 1239 for bending over movement from the waist and squatting movement with the knees.

Composite fabrics with a repellent coating can be difficult to laminate to other composite fabric layers, for example, 2 layers of web adhesive may be necessary, however dot matrix or other adhesive pattern may be preferable. The adhesive layer may be in a web pattern and can be thicker and less uniform than the dot matrix which can allow more air flow and would not affect composite stiffness as much.

Tests were conducted on composite fabrics that included an air gap between layers that were unlaminated and the same composite fabrics whose layers were laminated and without an air gap. The tests included air permeation, Moisture Vapor Transmission Rate (MVTR), thermal resistance (Rct) and Aerosol vapor liquid assessment group (AVLAG) all using the equipment and test procedures in the above disclosure. The following protective composite fabric embodiments of FIG. 1 were tested: Composite A is a liquid repellent stretch woven aramid fiber blend cover fabric with an ePTFE aerosol protective layer laminated to a vapor protective material and comfort liner; Composite B is a liquid repellent stretch woven aramid fiber blend cover fabric laminated to a vapor protective, comfort liner; Composite C is a liquid repellent stretch woven aramid fiber blend cover fabric laminated to a vapor protective material and comfort liner; Composite D is a liquid repellent woven aramid fiber blend cover fabric laminated to a vapor protective material and comfort liner; Composite E is a liquid repellent woven ripstop aramid fiber blend cover fabric laminated to a vapor protective, comfort liner; and Composite F is a liquid repellent woven ripstop aramid fiber blend cover fabric laminated to a vapor protective, comfort liner. For each of the above composite fabrics, the version with an air gap was evaluated by laying one layer atop the other layer and the version that was laminated was evaluated by laminating the multiple layers together with various adhesive methods such as described above.

Figure 13:
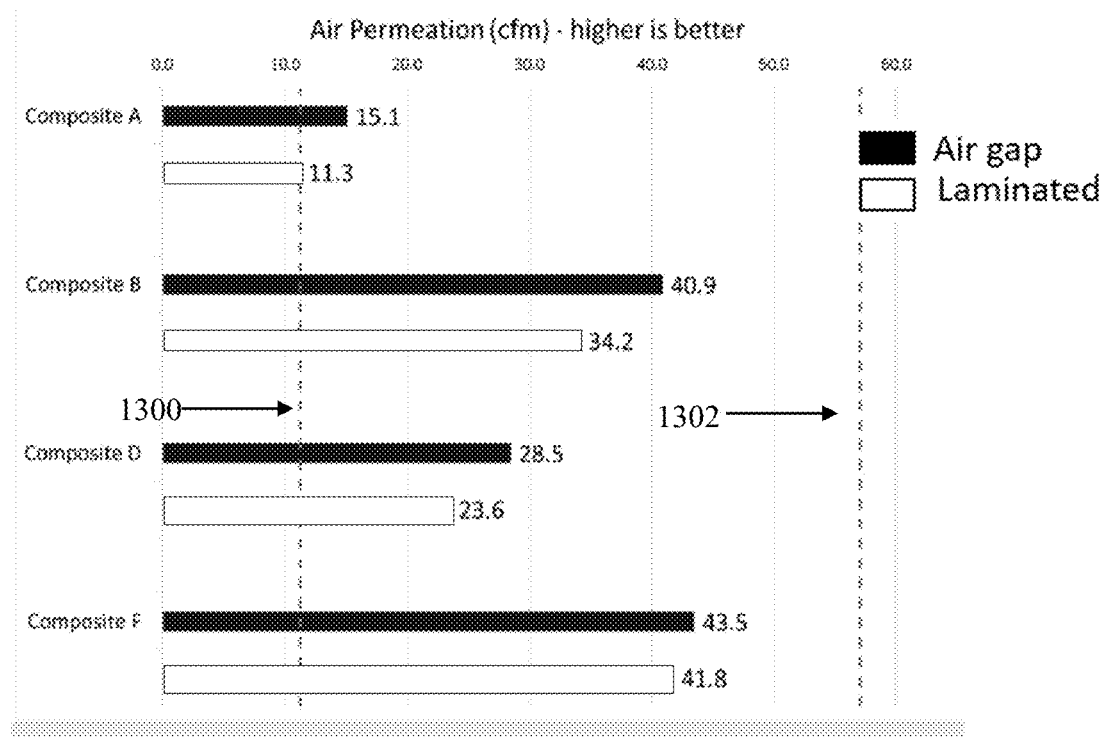
FIG. 13 is a graphical illustration of air permeation data.

The effect of lamination on air permeation is shown in FIG. 13 for Composites A, B. D and F both with unlaminated layers and with laminated layers demonstrate that air permeation is reduced with lamination. Also in FIG. 13 is the data for a baseline Chem/Bio protective garment 1300 and a fabric of a standard duty uniform 1302.

Figure 14:
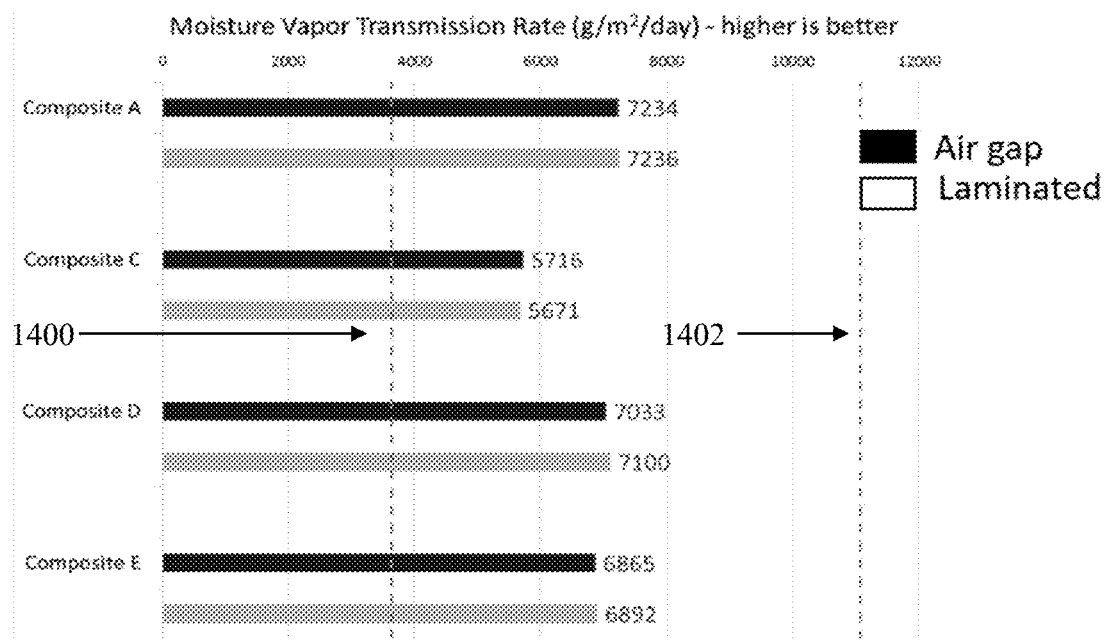
FIG. 14 is a graphical illustration of MVTR data.

The effect of an aerosol protective layer on MVTR is shown in FIG. 14 for Composites A, C, D and E both with unlaminated layers and with laminated layers demonstrate that MVTR does not change between laminated and unlaminated configurations. Also in FIG. 14 is the data for a baseline Chem/Bio protective garment 1400 and a fabric of a standard duty uniform 1402.

Figures 15, 16:
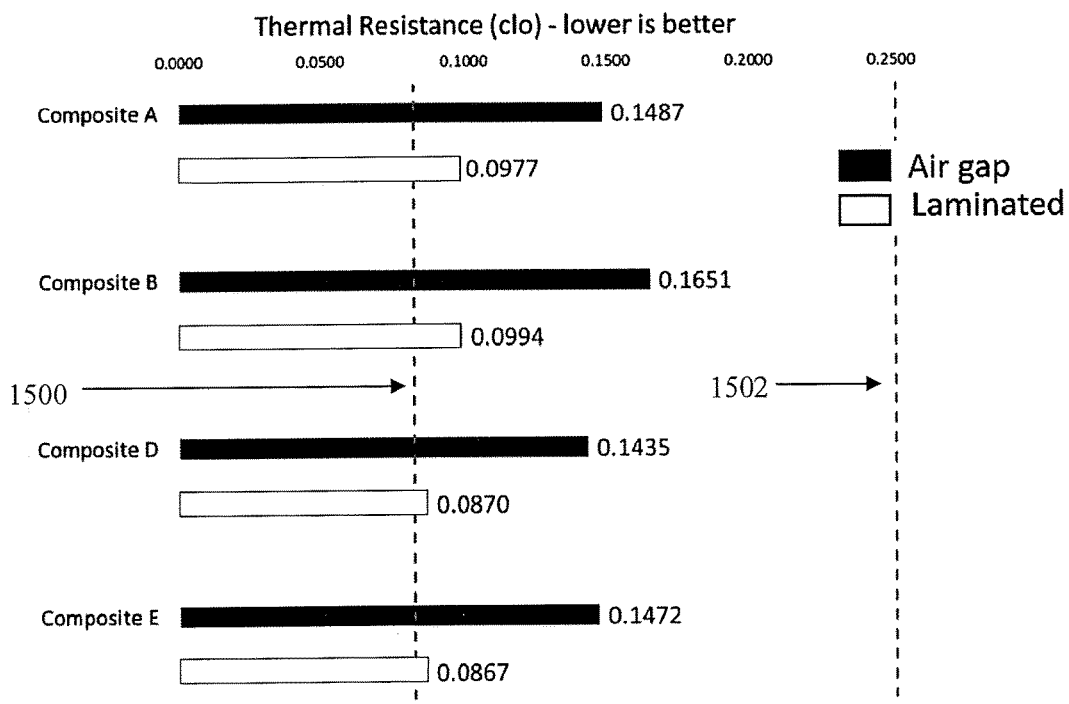
FIG. 15 is a graphical illustration of Rct data.
FIG. 16 is a table of AVLAG data.
Figures 17A, 17B:
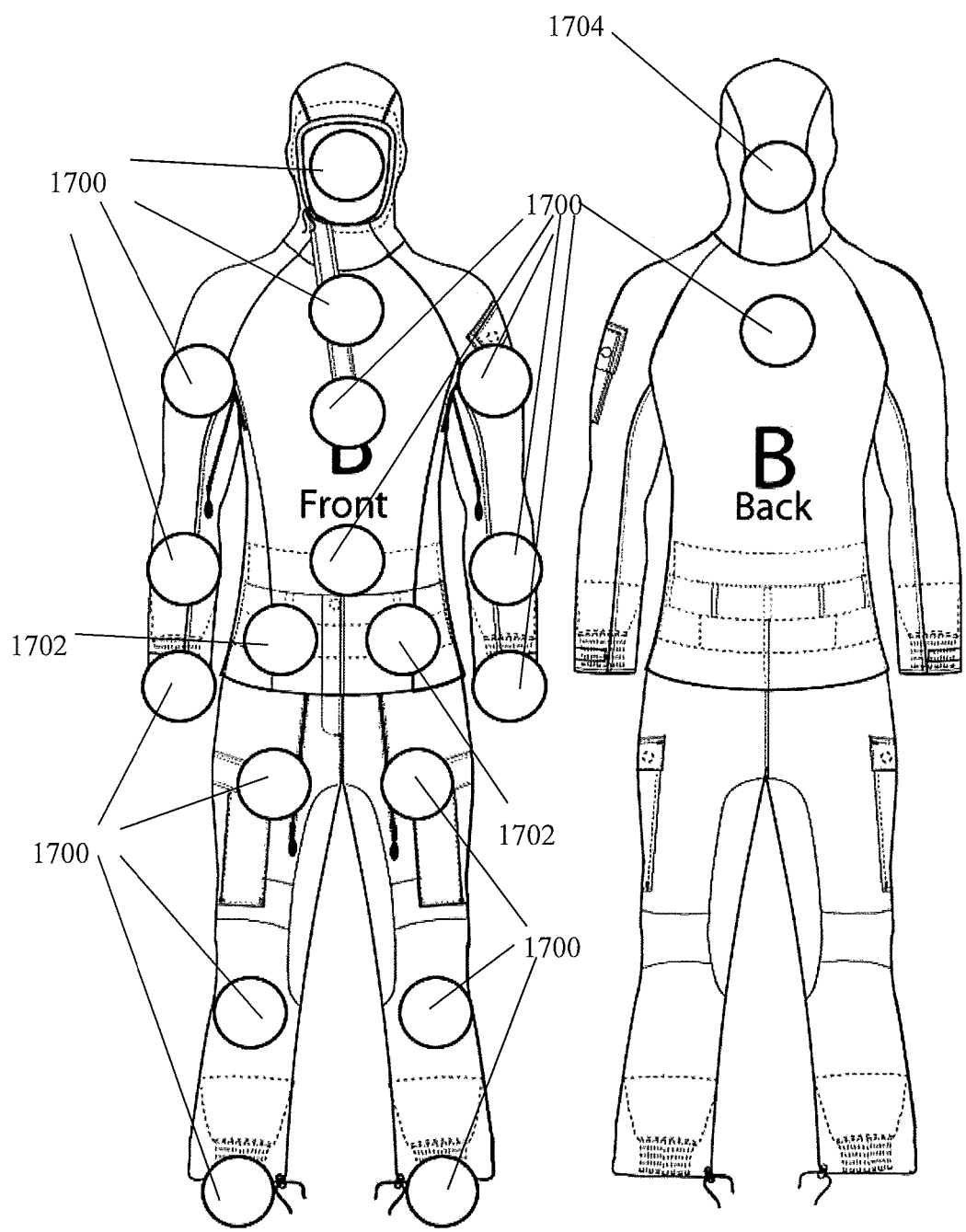
FIGS. 17A and 17B are the results of a thermal manikin study.

The effect of an aerosol protective layer on Rct is shown in FIG. 15 for Composites A, B, D and E both with unlaminated layers and with laminated layers demonstrates laminated configurations reduced thermal resistance between 30-40% by eliminating the air gap between layers, some laminate configurations have similar thermal resistances to the standard duty uniform—even with a sorptive liner. Also in FIG. 15 is the data for a baseline Chem/Bio protective garment 1500 and a fabric of a standard duty uniform 1502. The results are shown in the table of FIG. 16 demonstrate that lamination increases agent permeation and that the properties of the cover fabric may be important to the laminate structure: Composite A is thicker (0.49 mm vs 0.28 mm) and heavier (6.5 oz/yd2 vs 4.8 oz/yd2) than Composite E, Composite A is laminated with a dot matrix and Composite E with a web adhesive and Composite A has a better repellent coating A thermal manikin study was conducted on the embodiment illustrated in FIGS. 12A, 12B, 12C and 12D in which two prototypes were tested. The first prototype included the stretch protective composite fabric included a cover fabric, vapor protective layer and comfort layer and the non-stretch protective composite fabric included a cover fabric, vapor protective layer and comfort layer. The second prototype included the stretch protective composite fabric included the same materials as the first prototype. The results are illustrated in FIGS. 17A and 17B include circles that indicate where temperature sensors were located on the manikin and in which circles 1700 indicate that the thermal transfer between the two prototypes was the comparable, circles 1702 indicate that the thermal transfer was better than the second prototype vs. the first prototype and circles 1704 indicate that the thermal transfer was less than the second prototype vs. the first prototype This written description uses examples as part of the disclosure, including the best mode, and also to enable any person skilled in the art to practice the disclosed implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A protective garment including a jacket portion and a pant portion each comprising:
   at least two first portions comprising a non-stretch composite fabric, including:
   a. a first fabric cover layer comprising a woven fabric material;
   b. a first vapor protective layer;
   c. a first aerosol protective layer comprising ePTFE; and
   d. a first comfort layer
   wherein adjacent layers are laminated to one another to eliminate or substantially eliminate air gaps therebetween; and
   at least one second portion interposed between the first portions comprising stretch composite fabric for ease in movement by a wearer and consisting of:
   a. a second fabric cover layer comprising a knit material;
   b. a second vapor protective layer;
   c a second aerosol protective layer consisting of nanofibers composed of at least one of polyurethane, polysulfone, nylon-6, polyvinylidene difluoride and polyether sulfone or of microfibers including polypropylene; and
   d. a second comfort layer;
   wherein adjacent layers are laminated to one another to eliminate or substantially eliminate air gaps therebetween.

2. The protective garment according to claim 1, wherein the first and second fabric cover layers includes a liquid repellant coating.

3. The protective garment according to claim 1, wherein the first and second vapor protective layers comprise either a sorptive material or a semi-permeable membrane.

4. The protective garment according to claim 1, further comprising a plurality of first portions and second portions wherein each second portion being located generally about and generally covering a portion of a user's torso when the protective garment is worn by the user.

5. The protective garment according to claim 1 wherein the comfort layer comprises cotton.

\* \* \* \* \*